US009081647B2

(12) United States Patent
Hurek et al.

(10) Patent No.: US 9,081,647 B2
(45) Date of Patent: *Jul. 14, 2015

(54) SYSTEM AND METHOD OF RECONSTRUCTING COMPLEX CUSTOM OBJECTS

(71) Applicant: INTERNATIONAL BUSINESS MACHINES CORPORATION, Armonk, NY (US)

(72) Inventors: Thomas Hurek, Durham, NC (US); William A. Reichert, III, Troy, NY (US); Nishant Thakkar, Seattle, WA (US); Matthew B. Trevathan, Roswell, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/086,577

(22) Filed: Nov. 21, 2013

(65) Prior Publication Data

US 2014/0082590 A1 Mar. 20, 2014

Related U.S. Application Data

(63) Continuation of application No. 12/029,048, filed on Feb. 11, 2008, now Pat. No. 8,626,720.

(51) Int. Cl.
G06F 7/00 (2006.01)
G06F 17/00 (2006.01)
G06F 9/44 (2006.01)

(52) U.S. Cl.
CPC .............. *G06F 8/73* (2013.01); *G06F 9/4435* (2013.01)

(58) Field of Classification Search
CPC ....... G06F 8/00; G06F 11/00; G06F 17/2785; G06F 17/30377; G06F 17/30498; G06F 17/30584; G06F 17/30592; G06F 17/30607; G06N 5/00; G06T 11/008; G06T 13/00; G06T 13/20; G06T 17/20; G06T 2211/408; H04N 19/20; H04N 19/503; H04N 1/0311; G06Q 10/10; G06Q 10/06; G06Q 40/06; Y10S 707/99944; Y10S 707/99953; Y10S 707/99954

See application file for complete search history.

(56) References Cited

U.S. PATENT DOCUMENTS 4,853,843 A * 8/1989 Ecklund .............................. 1/1
6,529,909 B1 3/2003 Bowman-Amuah
6,609,130 B1 8/2003 Saulpaugh et al.
(Continued)

OTHER PUBLICATIONS

Preeda Rajasekaran, "Enhancing Web Service Descriptions Using WDSL-S", 2004, Citeseer, pp. 1-95.
(Continued)

*Primary Examiner* — Augustine K Obisesan
(74) *Attorney, Agent, or Firm* — John Pivnichny; Roberts Mlotkowski Safran & Cole, P.C.

(57) ABSTRACT

A system and method is provided for reconstructing one or more collections of objects across platforms. More particularly, Java Annotations are used to assist a Web Services Description Language (WSDL) wizard in reconstructing a collection of objects. In implementation, the system and method parses the object types such that a wizard can recreate or reconstruct the collection of objects for use by a receiving service. The method includes reconstructing a collection using one or more annotations that document a base object of the collection.

14 Claims, 2 Drawing Sheets

(56) References Cited

U.S. PATENT DOCUMENTS

| | | |
|---|---|---|
| 6,928,488 B1 | 8/2005 | de Jong et al. |
| 7,200,804 B1 | 4/2007 | Khavari et al. |
| 7,287,216 B1 | 10/2007 | Lee et al. |
| 7,440,967 B2 | 10/2008 | Chidlovskii |
| 7,539,978 B1 | 5/2009 | Haddox et al. |
| 7,617,504 B1 | 11/2009 | Hill et al. |
| 7,774,330 B2 | 8/2010 | Kalaboukis et al. |
| 7,873,908 B1 | 1/2011 | Varanasi et al. |
| 7,950,064 B2 | 5/2011 | Chavez et al. |
| 2003/0018402 A1 | 1/2003 | Breunese |
| 2003/0018661 A1 | 1/2003 | Darugar |
| 2003/0131010 A1 | 7/2003 | Redpath |
| 2003/0188292 A1 | 10/2003 | Herkert |
| 2003/0204645 A1 | 10/2003 | Sharma et al. |
| 2003/0208509 A1 | 11/2003 | Komine et al. |
| 2004/0015840 A1 | 1/2004 | Walker |
| 2004/0039964 A1 | 2/2004 | Russell et al. |
| 2004/0073870 A1 | 4/2004 | Fuh et al. |
| 2004/0111220 A1 | 6/2004 | Ochs et al. |
| 2004/0199636 A1 | 10/2004 | Brown et al. |
| 2004/0216086 A1 | 10/2004 | Bau |
| 2004/0225959 A1 | 11/2004 | D'Orto et al. |
| 2004/0261008 A1 | 12/2004 | Pepin et al. |
| 2005/0021689 A1 | 1/2005 | Marvin et al. |
| 2005/0022164 A1 | 1/2005 | Takacsi-Nagy |
| 2005/0097110 A1 | 5/2005 | Nishanov et al. |
| 2005/0097450 A1 * | 5/2005 | Lumera et al. ................ 715/511 |
| 2005/0097504 A1 | 5/2005 | Ballinger et al. |
| 2005/0144622 A1 | 6/2005 | Ballinger et al. |
| 2005/0172300 A1 | 8/2005 | Snover et al. |
| 2005/0234868 A1 | 10/2005 | Terek et al. |
| 2006/0010138 A1 | 1/2006 | Huerta et al. |
| 2006/0053368 A1 | 3/2006 | Bosworth et al. |
| 2006/0136435 A1 | 6/2006 | Nguyen et al. |
| 2006/0136483 A1 | 6/2006 | Nguyen et al. |
| 2006/0144010 A1 | 7/2006 | Wolf |
| 2006/0149817 A1 | 7/2006 | Bou-Ghannam et al. |
| 2006/0150204 A1 | 7/2006 | Beisiegel et al. |
| 2006/0200747 A1 | 9/2006 | Bhatia et al. |
| 2006/0277456 A1 * | 12/2006 | Biberstein et al. ............ 715/512 |
| 2007/0067421 A1 | 3/2007 | Angelov |
| 2007/0149817 A1 | 6/2007 | Fukushima et al. |
| 2008/0275829 A1 | 11/2008 | Stull et al. |

OTHER PUBLICATIONS

Ha, Y et al., "Integration of Semantic Web Service and Component-Based Development for e-business environment", IEEE Computer Society, Proceedings of the Fourth International Conference on Software Engineering Research, Management and Applications (SERA '06), 2006.

* cited by examiner

US 9,081,647 B2

SYSTEM AND METHOD OF RECONSTRUCTING COMPLEX CUSTOM OBJECTS

FIELD OF THE INVENTION

The invention generally relates to a system and method for computer systems and, more particularly, to a system and method for reconstructing complex objects across different platforms.

BACKGROUND OF THE INVENTION

Developers use collections and classes, like list, that are derived from collections to store, retrieve and manipulate data, and to transmit data from one method to another. The ability to iterate through collections and to generalize objects for reuse makes collections an excellent choice in many JAVA applications. However, current WSDL wizards cannot determine what types of objects are placed into the collection. So, once compiled, the wizard is unable to determine what the base object was in the collection. For this reason, the collection cannot be reconstructed by the wizard.

Rapid application development (RAD), JBOSS® and other development environments have not solved the problem of determining what was placed in the collection. (JBOSS is a registered trademark of Red Hat Inc. in the United States and/or worldwide.) For example, in many cases, the developer is placing the same object multiple times into the collection, which means that the collection contains objects derived from the same class. However, even in this case, the development environments cannot determine what was placed in the collection. In fact, known development environments can only reconstruct primitives.

RAD involves iterative development, and the construction of prototypes. Traditionally the rapid application development approach involves compromises in usability, features, and/or execution speed. It is described as a process through which the development cycle of an application is expedited. RAD thus enables quality products to be developed faster, saving valuable resources. JBOSS is cross-platform, usable on any operating system that Java supports.

Accordingly, there exists a need in the art to overcome the deficiencies and limitations described hereinabove.

SUMMARY OF THE INVENTION

In a first aspect of the invention, a method comprises reconstructing a collection using one or more annotations that document a base object of the collection.

In another aspect of the invention, a method for reconstructing a collection comprises providing a computer infrastructure being operable to: check if an object of a collection is annotated; retrieve a base class documented by the annotation; retrieve a template; and wrap the base class as an element in the template.

In another aspect of the invention, a computer program product for reconstructing a collection includes a computer readable media and first, second and third program instructions. The first program instructions identifies an annotation documenting a base object. The second program instructions retrieves the base object of the annotation, and the third program instructions reconstructs the collection using the annotation that documented the base object of the collection. The first, second and third program instructions are stored on the computer readable media.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF EMBODIMENTS OF THE INVENTION

The invention generally relates to a system and method for reconstructing one or more collections of objects across platforms. More particularly, the present invention uses Java Annotations to assist a Web Services Description Language (WSDL) wizard in reconstructing a collection of objects. In implementation, the system and method parses the object types such that a wizard can recreate or reconstruct the collection of objects for use by a receiving service. In comparison, known systems and services cannot support the collection of complex objects.

As should be understood by those of skill in the art, WSDL is an XML-based language that provides a model for describing web services over the Internet. A client program connecting to a web service can read the primitives associated with the WSDL to determine what functions are available on the server. Also, a collection (sometimes called a container) is a complex object that groups multiple elements into a single unit. Collections are used to store, retrieve and manipulate data, and to transmit data from one method to another. Collections typically represent data items that form a natural group, like an order (a collection of order lines), a mail folder (a collection of messages), or a telephone directory (a collection of name/phone-number pairs). But, as the collection includes complex objects it is impossible for a wizard to reconstruct the collection in WSDL file. However, by using the present invention, the collection is now defined (annotated) so that a wizard can reconstruct the WSDL file.

System Environment

Figure 1:
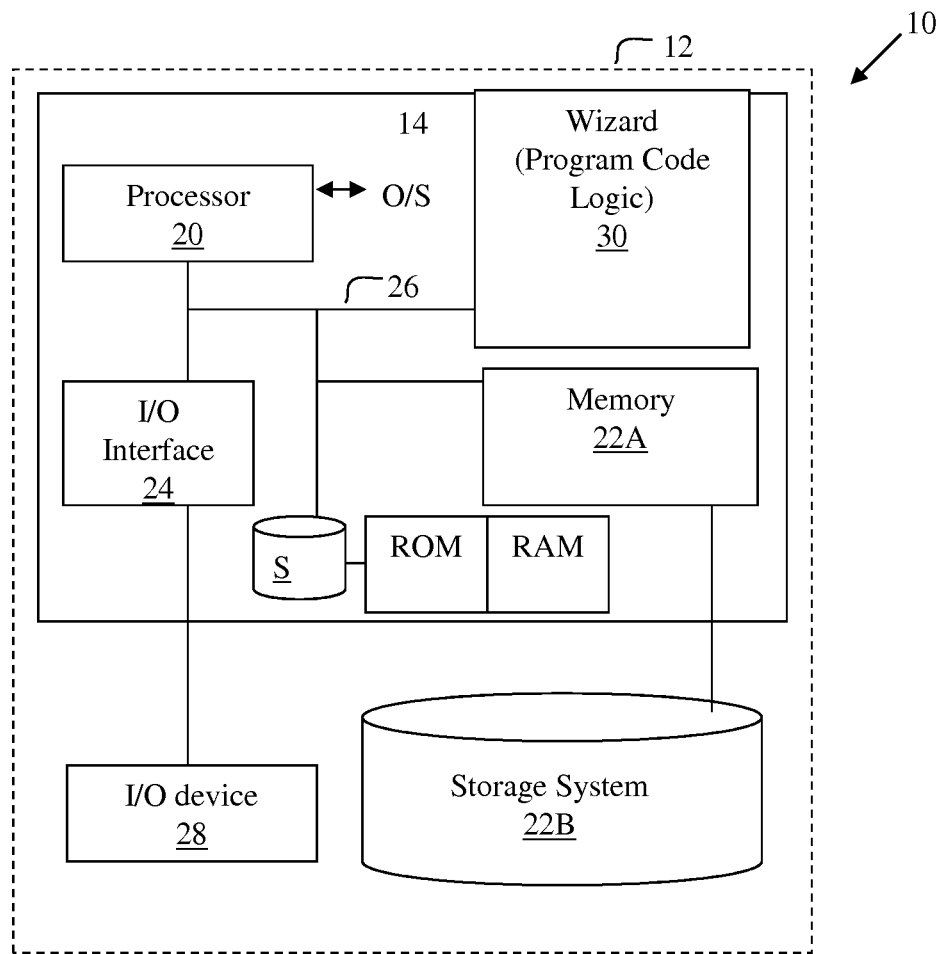
FIG. 1 shows an illustrative environment for implementing the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a wizard 30, which includes Program Control Logic to make the computing device 14 operable to perform the processes described herein. In embodiments, the wizard 30 is configured to reconstruct a collection using annotations or labels which define the contents (e.g., base objects or base class (which can be used interchangeably herein) of the collection.

In particular, the collection is annotated to define one or more base objects or classes thereby allowing the collection to be compatible with non-java based web service consumers, in addition to the above noted features. More fundamentally, the collection is provided with annotations or labels that define the contents (e.g., base classes or base objects) of the collection. This allows the collection to be readable outside the language, making it compatible with web service implementations. For example, in implementation, the annotations or labels are used by the wizard 30 to reconstruct the collection. This can be done by retrieving the base class of the annotation, retrieving a template for the collection and wrapping the base class into the template. In this way, the invention allows for the definitions of complex, custom objects (e.g., a collection) to be transferable across multiple platforms and automatically reconstructed by the wizard 30.

The computing device 14 includes a processor 20, a memory 22A, an input/output (I/O) interface 24, and a bus 26. The memory 22A can include local memory employed during actual execution of program code (Program Control Logic), bulk storage, and cache memories which provide temporary storage of at least some program code in order to reduce the number of times code must be retrieved from bulk storage during execution. Further, the computing device 14 is in communication with an external I/O device/resource 28 and a storage system 22B. The I/O device 28 can comprise any device that enables an individual to interact with the computing device 14 or any device that enables the computing device 14 to communicate with one or more other computing devices using any type of communications link. For example, the external I/O device/resource 28 may be keyboards, displays, pointing devices, etc. In accordance with the present invention, a programmer or designer can annotate the collection using the external I/O device/resource 28. A storage "S" may also be provided internally to the computing device 14.

In general, the processor 20 executes the Program Control Logic, which can be stored in memory 22A and/or storage system 22B or the wizard 30. While executing the Program Control Logic, the processor 20 can read and/or write data to/from memory 22A, storage system 22B, the wizard 30, and/or I/O interface 24. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code, as discussed in more detail below. In each embodiment, the Program Control Logic and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In one example, a programmer can annotate the collection of complex objects using a first computer infrastructure. The annotation can be used to define base classes or base objects in the collection. The collection can then be transmitted to a receiving computer infrastructure, where a wizard 30 on the receiving computer infrastructure reconstructs the WSDL file in XML. As noted herein, this is done by retrieving a base class (base object) as defined by the annotation, retrieving a template for the collection and wrapping the base class as an element in the template.

Exemplary Implementation

Normally, when a collection is created, the base class (object) in the collection is not known by the compiler and the WSDL generator. However, by implementing the present invention, the collection is defined in such a way that the base class (object) of the collection is known by the compiler and the WSDL generator. In its simplest form, the contents of the collection are labeled (annotated). This label allows the WSDL wizard to reconstruct the collection, as it now can determine the contents of the collection.

In one embodiment, to provide the advantages herein, Java annotations are used to document (define) the base object(s) used by the collection. For example, an exemplary annotation can be written as follows:

```
@Documented
public @interface BaseObject
{
String determineBase( );
}
```

This annotation will generate a javaDoc reference that shows the base object being added to the collection. As in the case of a collection, the service provider would know that the base element (object) of the collection would be MyMessageDTO class.

```
@BaseObject("MyMessageDTO") Collection
    mycollection=List( )
```

In one embodiment, the MyMessageDTO is as follows:

```
Public class MyMessageDTO( ){
Private String Message;
Private String MessageType;
...
```

The invention would break the collection into a group of complex types (base classes, base objects or other primitives) using the annotation to decompose the collection to the base objects that are placed into the collection. For example, the base object can be shown in the WDSL as follows:

```
<xsd:complexType name="MyMessageDTO">
<xsd:all>
<xsd:element name="message" type="xsd:string"/>
<xsd:element name="messagetype" type="xsd:string"/>
</xsd:all>
</xsd:complexType>
.....
```

Now that the base object is shown in the WSDL it is possible to use an xml plug-in to instruct the wizard how to handle the collection. This can be written, for example, as follows:

```
<type name="collection">
<array>
```

-continued

```
    </object>
  </array>
</type>
```

Additionally or alternatively, a hash, map or list can be used by the wizard. A hash, for example, can be defined as:

```
<type name="hash">
  <array>
  </hashobject>
  </array>
</type>
<type name="hashobject">
  </string>
  </object>
</type>
```

In this manner, a complex object can be converted to a simpler object (e.g., into its primitives). In this example, a collection of MyMessageDTO's would be written as:

```
<complexType name="CollectionMymessageDTO">
  <complexContent>
    <restriction base="soapenc:Array">
    <attribute ref="soapenc:arrayType"
    wsdl:arrayType="tns:MyMessageDTO[ ]"/>
    </restriction>
  </complexContent>
```

Notice that the word "collection" defines the complex type. When a client (wizard) that implements collections is used, it can parse the name and determine that it is using an object type that can be transcoded back into its base object.

Also, in order for transcoding to work properly, the WSDL element names are preferably a name of an attribute in the class. This becomes important when the tool creates objects like hash maps where there is a key/value relationship.

Exemplary Processes in Accordance with the Invention

Figure 2:
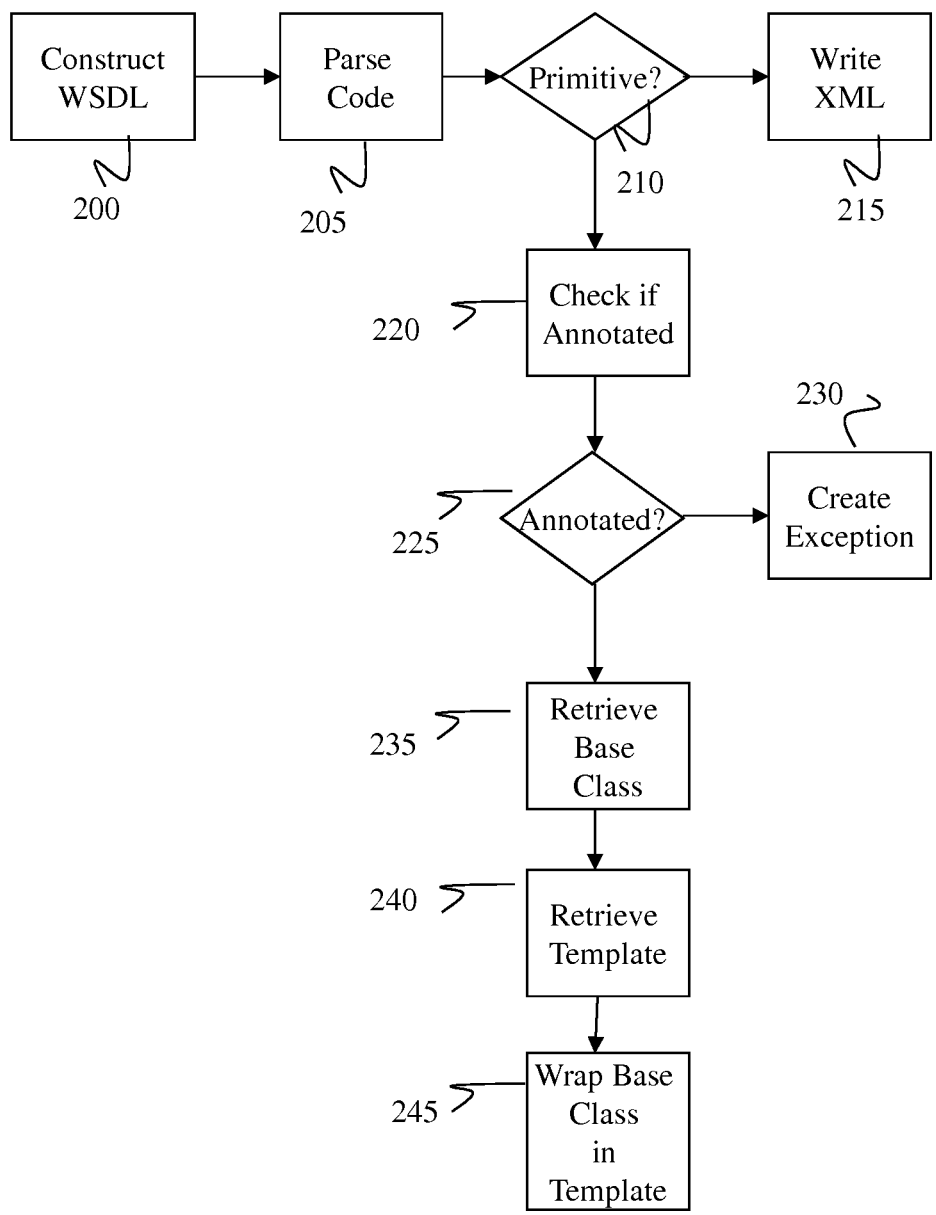
FIG. 2 shows a flow chart implementing processes in accordance with aspects of the invention.

FIG. 2 is a flow diagram showing processing steps of embodiments of the invention. FIG. 2 may equally represent a high-level block diagram of components of the invention implementing the steps thereof. The steps of FIG. 2 may be implemented on computer program code in combination with the appropriate hardware. This computer program code (Program Control Logic) may be stored on storage media such as a diskette, hard disk, CD-ROM, DVD-ROM or tape, as well as a memory storage device or collection of memory storage devices such as read-only memory (ROM) or random access memory (RAM) shown in FIG. 1. Additionally, the computer program code can be transferred to a workstation over the Internet or some other type of network.

The invention can take the form of hardware and software elements as shown in FIG. 1, e.g., computer infrastructure. The software elements may be firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

In embodiments, a service provider, such as a Solution Integrator, could offer to perform the processes described herein. In this case, the service provider can create, maintain, deploy, support, etc., the computer infrastructure that performs the process steps of the invention for one or more customers. In return, the service provider can receive payment from the customer(s) under a subscription and/or fee agreement.

Referring to FIG. 2, at step 200, the wizard begins the construction of a WSDL file. At step 205, the wizard parses code for the objects that are output for the XML. At step 210, a determination is made as to whether the object(s) is a primitive. If the object(s) is a primitive, at step 215, the wizard writes the XML using the primitive. If the object(s) is not a primitive, at step 220, the parser checks if the object(s) is annotated. At step 225, a determination is made as to whether the object is annotated, e.g., identifies an annotation. If the object is not annotated, at step 230, the wizard creates an exception, e.g., does not reconstruct the collection.

If the object is annotated, at step 235, the wizard retrieves the base class (base object) of the annotation. The wizard retrieves the template for the collection, map, hash or library, at step 240. At step 245, the wizard wraps the base class (base object) as an element in the template. In this manner, the wizard can now reconstruct the collection in an XML.

Thus, as should now be understood by those of skill in the art, the wizard is configured to reconstruct the collection of complex objects from its basic structure (which is understandable by the WSDL). That is, once the collection of complex objects is decomposed into as simple types as possible, e.g., primitives, the wizard can reconstruct the collection using a label (which defines the contents of the collection). For example, once the collection is broken into its primitives, the wizard can reconstruct the WSDL on a receiving computing device using a template for the collection. By breaking down the collection into its primitives, the service consumer and the service provider can now both understand what will be returned by the WSDL file, even though it is a collection of complex objects. In this manner, a collection of complex objects can be broken down into their simplest form to allow a standard interaction between a consumer and service provider, effectuating a transaction that would not have otherwise been possible using a wizard.

While the invention has been described in terms of embodiments, those skilled in the art will recognize that the invention can be practiced with modifications and in the spirit and scope of the appended claims.

What is claimed is:

1. A system comprising:
   a CPU, a computer readable memory and a computer readable storage medium;
   program instructions to decompose a collection of complex objects into one or more base objects using one or more annotations that document the one or more base objects that are placed in the collection, wherein the decomposing comprises:

parsing code for one or more objects;
determining whether the parsed one or more objects is a primitive;
when the one or more objects is primitive, writing a Web Services Description Language (WSDL) file using the primitive; and
when the one or more objects is not the primitive, performing the following:
  determining whether the one or more objects is annotated,
  wherein the annotations are Java annotations, which:
    define the one or more base objects used by the collection;
    generate a javaDoc reference that shows the one or more base objects being added to the collection; and
    break the collection into a group of complex object types and decompose the collection to the one or more base objects that are placed in the collection;
  when the one or more objects is not annotated, generating an exception that does not reconstruct the collection; and
program instructions to automatically reconstruct the definitions of the complex objects within the collection using a wizard when the one or more objects is annotated,
wherein:
  the wizard uses an XML plug-in to determine how to handle the collection;
  the reconstructing using the wizard comprises:
retrieving the one or more base objects for the collection using the one or more annotations determined from the one or more objects of the collection;
  retrieving a template for reconstructing the collection as an XML using the retrieved one or more base objects for the collection; and
  reconstructing the collection by wrapping the retrieved one or more base objects as elements in the retrieved template; and
  the program instructions are stored on the computer readable storage medium for execution by the CPU via the computer readable memory.

2. The system of claim 1, wherein when the one or more objects is the primitive, reconstructing an XML using the primitive.

3. The system of claim 1, wherein the template is retrieved for a hash, map or library, which documents the one or more base object.

4. The system of claim 1, wherein the computer infrastructure is operable to reconstruct the collection by writing the collection in XML using the template.

5. The system of claim 1, wherein the collection is the WSDL file.

6. The system of claim 1, wherein the collection is a complex object that groups multiple elements into a single unit and stores, retrieves, manipulates data, and transmits data from one method to another.

7. The system of claim 6, wherein the wizard uses the template comprising a hash, map, or list to convert a complex object into a simpler object.

8. The system of claim 1, wherein the collection is annotated to define the one or more base objects, wherein:
  the collection is compatible with non-Java based web service consumers and web service implementations; and
  definitions of complex, custom objects are transferable across multiple platforms and automatically reconstructed by a wizard.

9. The system of claim 8, wherein the one or more annotations are Java annotations, which:
  define the one or more base objects used by the collection;
  generate a javaDoc reference that shows the one or more base objects being added to the collection; and
  break the collection into a group of complex object types and decompose the collection to the one or more base objects that are placed in the collection.

10. The system of claim 1, wherein WSDL element names are a name of an attribute in the one or more base objects and define a relationship between the collection of the complex objects and the one or more base objects.

11. The system of claim 1, wherein Java annotations generate a Java document reference which shows the one or more base objects being added to the collection.

12. The system of claim 1, wherein the one or more annotations are the Java annotations which define the one or more base objects used by the collection.

13. The system of claim 12, wherein the collection is a collection of classes which include a name, a complex context, a restriction base, and an attribute reference.

14. A system comprising a computer infrastructure including a processor operable to:
decompose a collection of complex objects into one or more base objects using one or more annotations that document the one or more base objects, wherein the decomposing comprises:
  parsing code for one or more objects;
  when the one or more objects is the primitive, writing the collection using the primitive; and
  when the one or more objects is not the primitive, performing the following:
    determine whether the one or more objects is annotated, wherein the annotations are Java annotations, which:
      define the one or more base objects used by the collection;
      generate a javaDoc reference that shows the one or more base objects being added to the collection; and
      break the collection into a group of complex object types and decompose the collection to the one or more base objects that are placed in the collection;
    when the one or more objects is not annotated generate an exception that does not reconstruct the collection; and
    when the one or more objects is annotated, automatically reconstruct the definitions of the complex objects within the collection using a wizard,
  wherein:
    the wizard uses an XML plug-in to determine how to handle the collection; and
    reconstructing the collection using the wizard comprises:
      retrieving the one or more base classes documented by the one or more annotations;
      retrieving a template for reconstructing the collection as an XML using the retrieved one or more base objects for the collection; and
      reconstructing the collection into a Web Services Description Language (WSDL) file by wrapping the retrieved one or more base objects as elements in the retrieved template.

* * * * *